(No Model.)

C. W. MILLET.
BICYCLE TIRE.

No. 477,769. Patented June 28, 1892.

WITNESSES:
H. A. Carhart
H. W. Bates.

INVENTOR,
Charles W. Millet.
BY
Smith & Benison
ATTORNEYS

UNITED STATES PATENT OFFICE.

CHARLES W. MILLET, OF DOLGEVILLE, NEW YORK.

BICYCLE-TIRE.

SPECIFICATION forming part of Letters Patent No. 477,769, dated June 28, 1892.

Application filed March 14, 1892. Serial No. 424,907. (No model.)

*To all whom it may concern:*

Be it known that I, CHARLES W. MILLET, of Dolgeville, in the county of Herkimer, in the State of New York, have invented new and useful Improvements in Bicycle-Tires, of which the following, taken in connection with the accompanying drawings, is a full, clear, and exact description.

My invention relates to bicycle-tires, and particularly to that class which is commonly known as "pneumatic."

My object is to produce an improved pneumatic tire in which the air-chamber is subdivided into separate chambers, each complete in itself and each consisting of a hollow ring of flexible material sealed up, said rings being arranged within the tire side by side or in lines substantially radial to the wheel and bearing inwardly against the concave outer face of the tire, said rings being strung upon a cord or wire passed through their central openings or not, as desired, the tire being flexibly and detachably secured to the felly.

My invention consists in the several novel features of construction and operation hereinafter described, and which are specifically set forth in the claims hereunto annexed.

Figure 2:
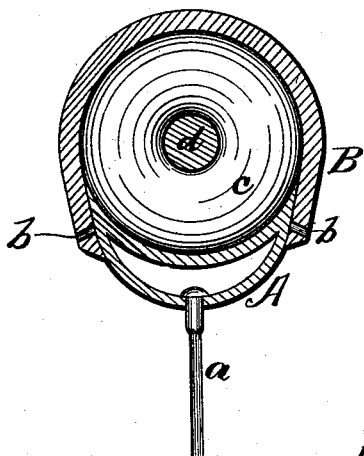
Figure 1:
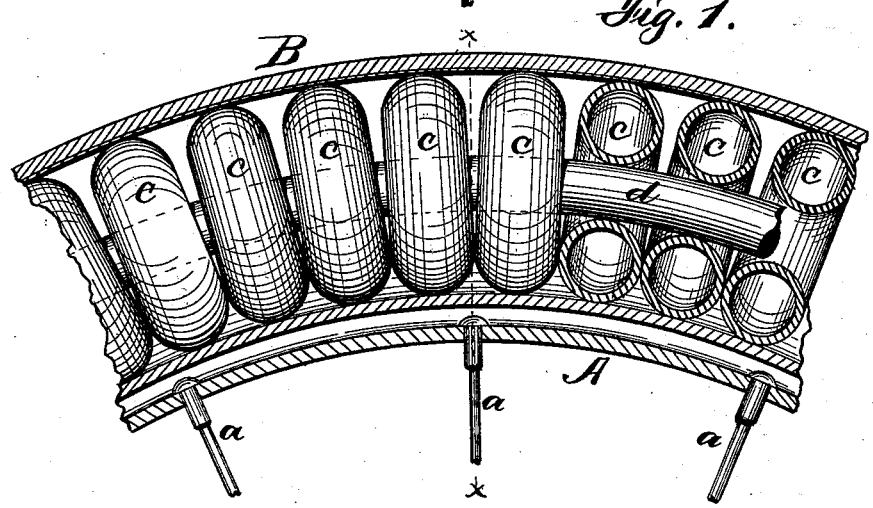
Figure 3:
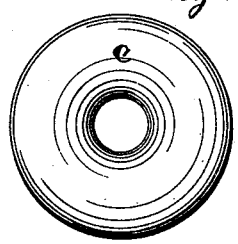

It is constructed as follows, reference being had to the accompanying drawings, in which—
Figure 1 is a sectional side elevation of part of the rim of a wheel. Fig. 2 is a transverse section on line $x$ $x$ of the whole rim. Fig. 3 is a plan view of one of the rings.

A is the felly or rim of the wheel, and $a$ $a$ are the spokes thereof, said tire having a concave outer face or periphery.

B is the tire, of suitable elastic material, overlapping the edges of the rim exteriorly and secured thereto detachably, as by screws inserted through the holes $b$ therein, located at suitable intervals. Between the rim and tire and secured there by said tire and bearing against both the rim and tire I place the hollow rings $c$ side by side on or substantially upon lines radial to the wheel on account of the circle of the rim. These rings are hollow or tubular, as shown, are sealed up tight, and each constitutes an air-chamber in itself separate from the adjoining rings or any other ring. In Fig. 1 I show these rings strung upon a cord or wire $d$ of proper size to substantially fill the central openings therein and affording an auxiliary support to the rings, separately and jointly, against any force exerted against the tire. This cord, however, can be omitted, if desired. It will be readily seen that in case one of these hollow rings is punctured the tire can be removed or loosened, the damaged ring found, and a new one inserted very easily and at little cost, wherever the accident may have happened, and the damaged ring can be repaired very easily.

What I claim as my invention, and desire to secure by Letters Patent, is—

1. In a bicycle-tire, the combination, with the tire and rim, of the hollow elastic rings inclosed between them and arranged side by side.

2. In a bicycle-tire, the combination, with the tire and rim, of tubular elastic rings disposed upon the rim side by side in lines substantially radial to the wheel and inclosed by the tire detachably connected to the rim.

3. In a bicycle-tire, the combination, with the tire and rim, of hollow elastic rings arranged side by side upon the rim, a cord upon which they are strung, and a tire inclosing them and detachably connected to the rim.

In witness whereof I have hereunto set my hand this 2d day of March, 1892.

CHAS. W. MILLET.

In presence of—
A. L. LEMITT,
Z. G. BROCKETT,
HOWARD P. DENISON.